United States Patent Office 2,759,942
Patented Aug. 21, 1956

2,759,942

SUBSTITUTED PIPERIDINECARBOXYLATES AND METHODS OF PREPARING SAME

John Krapcho, New Brunswick, N. J., assignor to Olin Mathieson Chemical Corporation, New York, N. Y., a corporation of Virginia No Drawing. Application March 5, 1952,
Serial No. 275,020

9 Claims. (Cl. 260—294.3)

This application relates to and has for its object the provision of: (A) esters of the general formula

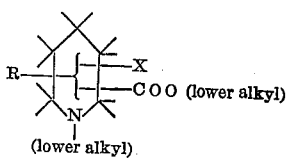

wherein: R is a member of the class consisting of alkyl, alkoxy, and hydrogen groups; X is the acyl residue of a carboxylic acid (I) the X and the —COO(lower alkyl) group being attached to the same carbon atom; (B) acid-addition salts thereof; (C) quaternary ammonium salts thereof, and (D) methods of preparing (A), (B), and (C). [The acyl residue of a carboxylic acid may be aliphatic (such as acetyl), carbocyclic (such as benzoyl, or cyclohexanecarbonyl) or heterocyclic (such as 2-thenoyl); and the acyl residue may also contain such substituents as alkyl, hydroxy, alkoxy and halogen groups.]

These compounds are useful and advantageous therapeutic agents, especially antispasmodics. The quaternary ammonium salt (the methyl bromide) of ethyl 4-benzoyl-1-methylisonipecotate, a compound representative of group C defined hereinbefore, may be administered orally (e. g. in tablet form) in the relief of intestinal colic, and to diminish gastric secretion in patients with gastric ulcers. The corresponding compound in the form of its hydrochloride acid-addition salt has beneficial effects when administered orally (e. g. in tablet form) in Parkinson's disease.

Among the preferred compounds are: the acid-addition salts of esters having the following general formula

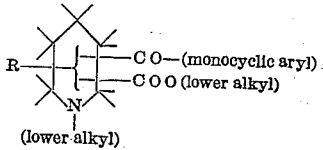

and the quaternary ammonium salts thereof with alkyl halides.

The esters (I) in which X is an acyl residue of a carboxylic acid are prepared by the method essentially comprising interacting a compound (II) of the general formula

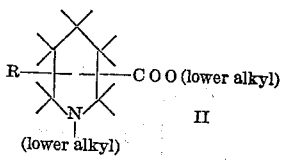

with an acyl halide (III) in the presence of an alkaline condensing agent and in an organic solvent (e. g. toluene, benzene and especially ether). Thus, the following compounds II and III may be used in the preparation of the compounds of the invention:

II

Ethyl 1-methylnipecotate
Methyl 1-methylisonipecotate
Ethyl 1-methylpipecolate
Ethyl 5-ethyl-1-methylnipecotate
Propyl 1-methylnipecotate
Isopropyl 1-methylnipecotate
Ethyl 1-ethylisonipecotate
Ethyl 1-propylnipecotate
Ethyl 5-ethoxy-1-methylnipecotate
Ethyl 3-propoxy-1-methylisonipecotate
Ethyl 6-propyl-1-methylnipecotate
Butyl 1-methylnipecotate These reactants can be prepared as described hereinafter in the examples—i. e.

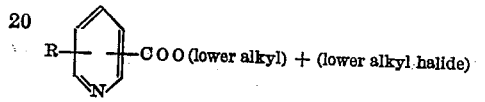

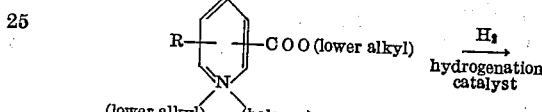

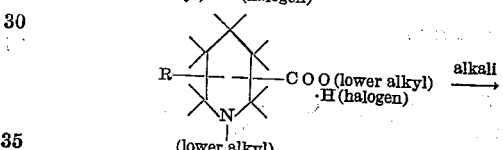

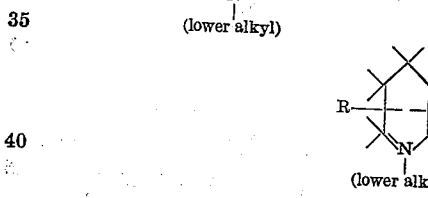 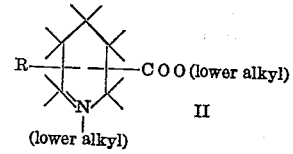

III

Benzoyl chloride
m-Hydroxybenzoyl chloride
p-Chlorobenzoyl chloride
Anisoyl chloride
Acetyl chloride
Propanoyl chloride
2-methylpropanoyl bromide
Cyclohexanecarbonyl chloride
Cyclopentanecarbonyl chloride
o-Chlorobenzoyl chloride
Salicyloyl chloride
2-Methylbenzoyl chloride
4-propybenzoyl chloride
p-Ethoxybenzoyl chloride
2-thenoyl chloride
2-furoyl chloride
3-thenoyl chloride The alkaline condensing agents utilizable in the practice of this invention comprise inter alia, sodamide, sodium hydride, lithium amide, sodium ethoxide, potassium t-butoxide, (metallic) alkali metals (such as sodium and potassium), (solid) alkali metal hydroxides (such as NaOH and KOH) and (preferably) alkali metal derivatives of triphenylmethane. Preferably, the alkaline condensing agent is dissolved or suspended in an inert organic solvent (especially ether) and this solution (or suspension) is used as the reaction medium.

The catalytic-hydrogenation employed in the foregoing procedures may be effected with a variety of catalysts and under a variety of conditions. Among the utilizable catalysts are platinum dioxide (the Adams-platinum-oxide catalyst), Raney nickel, and palladium black. Advantageously, carrier-supported catalysts may also be utilized, such as palladium-carbon or palladium-barium sulfate. In the case of platinum dioxide, the catalytic-hydrogenation may be effected at superatmospheric pressure (e. g., about 2 to 3 atmospheres) and/or at slightly elevated temperatures to expedite the hydrogenation. The catalytic-hydrogenation may be effected in any medium which does not chemically affect the reactant, inter alia, ethyl acetate, water, and (preferably) absolute ethanol; and other means than that specifically disclosed hereinafter may be employed to effect intimate contact between the hydrogen, the reactant, and the hydrogenation catalyst.

The compounds of this invention are not only therapeutically utilizable as described hereinbefore, but they also can be utilized in the preparation of other therapeutically important compounds. Thus, compounds of the invention (preferably the esters I or their acid-addition salts) can be reacted with an amine or diamine, or with a basic aliphatic alcohol, e. g.

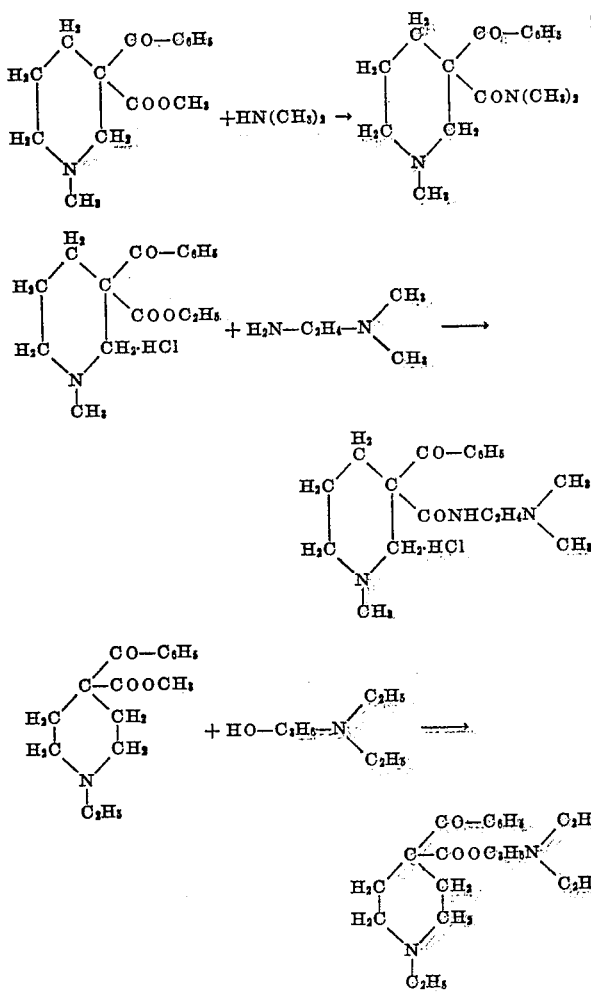

In the methods of preparing compound I the esters may be obtained as such (i. e., as the free base) or in the form of their acid-addition salts (e. g., as hydrochlorides, if the halogen in the reactant is chlorine). The acid-addition salts may be converted to the free bases in the conventional manner, i. e., by neutralization with alkali; and the free bases may be converted to other acid-addition salts by reacting the base with the desired acid in a suitable solvent. The utilizable acids comprise, interalia: hydrobromic, boric, nitric, lactic, tartaric, citric, succinic, phosphoric, sulfuric, maleic, fumaric and (especially) hydrochloric.

By the addition of alkyl halides, dialkyl sulfates, aralkyl halides, aryl halides, or the like, there are obtained in the usual manner quaternary ammonium salts of the esters (A) described hereinbefore.

The following examples are illustrative of the invention:

EXAMPLE 1

*Preparation of ethyl 3-benzoyl 1-methylnipecotate and the hydrochloride thereof*

(a) *Ethyl nicotinate methobromide.*—A solution of 40.0 g. ethyl nicotinate in 150 ml. acetone is treated with 38.0 g. methyl bromide in 87 ml. acetone; the quaternary ammonium salt separates from the solution as long colorless needle-like crystals. After standing overnight, the mixture is diluted with about 100 ml. ether and the resulting hygroscopic product is filtered and dried, M. P. about 95–97° C.; yield about 57 g.

(b) *Ethyl 1-methylnipecotate.*—A solution of 30.0 g. ethyl nicotinate methobromide, as prepared in (a), in 140 ml. ethanol, and 0.3 g. platinum dioxide are interacted in a Parr apparatus, at room temperature, with hydrogen, at 60 lbs. pressure. (The theoretical quantity of hydrogen is consumed in forty-five minutes.) The catalyst is filtered and the solvent is removed by evaporation at reduced pressure to yield the colorless hydrobromide salt. This process is repeated several times, the runs combined, and the hydrobromide obtained from reduction of 160 g. of the methobromide is then dissolved in 100 ml. water and made alkaline with 28 g. sodium hydroxide dissolved in 100 ml. water. The free base is extracted with ether and dried over magnesium sulfate. After evaporation of the solvent, the residue is fractionated to yield about 99.1 g. of a colorless distillate; B. P. about 56–50° C./3 mm.; $n_D^{22}=1.4492$.

The picrate of this base, after crystallization from ethanol, melts at 146–147° C.

(c) *Ethyl 3-benzoyl-1-methylnipecotate.*—To 1.4 liters of 0.118 M. ethereal solution of triphenylmethyl sodium (Hauser, Organic Reactions, vol. I, pg. 286) is added 28.2 g. ethyl 1-methylnipecotate, prepared in (b). After stirring for two hours at room temperature, the pale yellow solution is treated dropwise (five minutes) with a solution of 23.9 g. benzoyl chloride in 20 ml. ether. This mixture is allowed to stand overnight and then refluxed for two hours, cooled and extracted with 100 ml. water. The aqueous layer is discarded and the organic phase extracted with a solution of 16 ml. concentrated hydrochloric acid in 100 ml. water and then with two 50 ml. portions of water. The aqueous portions are combined and made alkaline with a solution of 8.8 g. sodium hydroxide in 50 ml. water. The liberated base is extracted with ether and dried over magnesium sulfate. After evaporation of the solvent, the residue is fractionated to yield about 33.6 g. of a colorless distillate, the free base; B. P. about 137–140° C./0.4 mm.

(d) The base (25.47 g.) is dissolved in 100 ml. ether and treated with 46.3 ml. 2 N alcoholic hydrogen chloride. Dilution of the solution with 400 ml. ether yields a colorless crystalline product, weighing about 27.5 g.; M. P. about 140.5–142° C. (dec.). After recrystallization from 200 ml. butanone, the product separates as colorless hexagonal-like crystals, M. P. about 140.5–142° C. (dec.); and has the formula

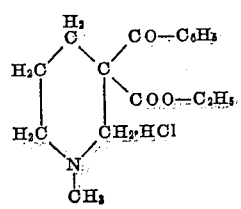

Using a molar equivalent of acetyl chloride, in Example 1 (c), in place of benzoyl chloride, ethyl 3-acetyl-1-methylnipecotate and the hydrochloride are obtained.

EXAMPLE 2

*Preparation of ethyl 3-benzoyl-1-methylnipecotate methobromide*

A solution of 5.16 g. ethyl 3-benzoyl-1-methylnipecotate, prepared as described in Example 1 (c), in 25 ml. acetone is treated with a solution of 2.85 g. methyl bromide in 6.5 ml. acetone; a crystalline product separates within thirty minutes. After standing at room temperature, the product is filtered; weight about 6.9 g.; M. P. about 179° C. (dec.). When this material is recrystallized from 60 ml. isopropyl alcohol the product melts at about 179° C. (dec.); and the product has the general formula

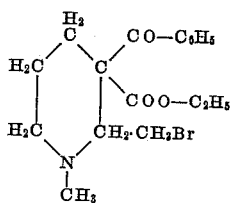

Using molar equivalents of ethyl bromide, benzyl chloride, dimethyl sulfate, or methyl p-toluene-sulfonate in place of methyl bromide in this example the corresponding quaternary ammonium salts of ethyl 3-benzoyl-1-methylnipecotate are obtained.

EXAMPLE 3

*Preparation of ethyl 4-benzoyl-1-methylisonipecotate and the hydrochloride thereof*

(a) *Ethyl isonicotinate methoiodide.*—A solution of 8.5 ethyl isonicotinate (J. Chem. Soc., 1941, 41) in 50 ml. ethanol is treated with 15g. methyl iodide. After standing overnight, the orange-colored solution is diluted with ether to yield about 14.9 g. of precipitate, M. P. about 122–124° C. When this material is crystallized from 30 ml. isopropyl alcohol it weighs about 12.1 g.; M. P. about 122–124° C.

(b) *Ethyl 1-methylisonipecotate.*—Catalytic reduction of 90 g. ethyl isonicotinate methiodide, prepared as described in (a), according to the procedure described in Example 1 (b) yields ethyl 1-methylisonipecotate hydroiodide. The hydroiodide is treated with sodium hydroxide solution and yields about 40 g. of the free base, B. P. about 58–59° C./2 mm. of the general formula

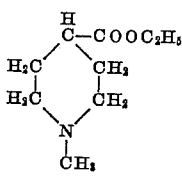

(c) *Ethyl 4-benzoyl-1-methylisonipecotate.*—Interaction of 35.6 g. ethyl 1-methylisonipecotate and 31.6 g. benzoyl chloride in 1.4 liter of 0.16 M ethereal triphenylmethyl sodium according to procedure described in Example 1(c) yields about 38 g. of the free base, B. P. about 136–139° C./0.3 mm.

(d) The base (26.1) g. is dissolved in 50 ml. ether and is treated with 25.1 ml. of 3.78 N alcoholic hydrogen chloride. After dilution with ether, the resulting solution yields about 28.5 g. of a colorless precipitate, M. P. about 165° (dec.). When this material is purified by recrystallization from isopropyl alcohol it melts at about 172.5–173° C. (dec.); the product has the general formula

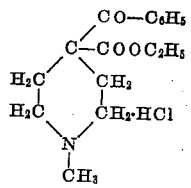

Using a molar equivalent of 2-thenoyl chloride, in Example 3(c), in place of benzoyl chloride, ethyl 4-(2-thenoyl)-1-methylisonipecotate and the hydrochloride thereof are obtained.

Using a molar equivalent of o-chlorobenzoyl chloride, in Example 3(c), in place of benzoyl chloride, ethyl 4-(o-chlorobenzoyl)-1-methylisonipecotate and the hydrochloride thereof are obtained.

EXAMPLE 4

*Preparation of ethyl 4 - benzoyl - 1 - methylisonipecotate methobromide*

A solution of 5.0 g. ethyl 4-benzoyl-1-methylisonipecotate, prepared as described in Example 3, in 25 ml. acetone is treated with a solution of 2.85 g. methyl bromide, dissolved in 7 ml. acetone; a crystalline salt separates after several minutes. After standing at room temperature for two days, the product is filtered, yielding about 5.35 g.; M. P. about 189° (dec.). When the product is recrystallized from 30 ml. isopropyl alcohol it melts at about 190° C. (dec.); the product has the general formula

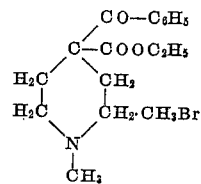

The invention may be variously otherwise embodied within the scope of the appended claims.

I claim:

1. A compound of the class consisting of: (A) esters of the general formula:

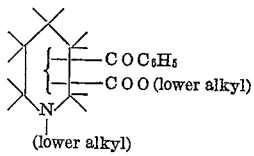

wherein both the —COC₆H₅ and —COO (lower alkyl) groups are attached to one of carbon atoms 3 and 4; (B) acid-addition salts thereof; and (C) quaternary ammonium salts thereof.

2. An acid-addition salt of an ester of the general formula:

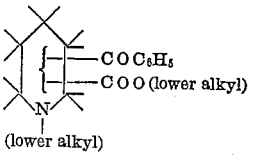

wherein both the —COC₆H₅ and —COO (lower alkyl) groups are attached to one of carbon atoms 3 and 4.

3. A quaternary ammonium salt of an ester of the general formula:

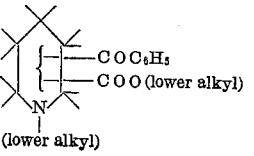

wherein both the —CO₆H₅ and —COO (lower alkyl) groups are attached to one of carbon atoms 3 and 4.

4. The method which essentially comprises interacting a compound of the general formula:

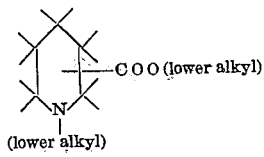

the —COO (lower alkyl) group being on one of carbon atoms 3 and 4, with benzoyl chloride in the presence of an alkaline condensing agent and in an organic solvent, and recovering the reaction product.

5. Ethyl 3-benzoyl-1-methylnipecotate hydrochloride.
6. Ethyl 3-benzoyl-1-methylnipecotate methobromide.
7. Ethyl 4-benzoyl-1-methylisonipecotate hydrochloride.
8. Ethyl 4-benzoyl-1-methylisonipecotate methobromide.
9. Ethyl 4-benzoyl-1-methylisonipecotate.

References Cited in the file of this patent
UNITED STATES PATENTS
591,483    Merling _____ Oct. 12, 1897